(12) United States Patent
Jain et al.

(10) Patent No.: US 11,803,361 B2
(45) Date of Patent: Oct. 31, 2023

(54) SYSTEMATIC INSTALLATION OF SOFTWARE EXTENSIONS

(71) Applicant: SAP SE, Walldorf (DE)

(72) Inventors: Nikita Jain, Bangalore (IN); Devashish Biswas, Haridwar (IN)

(73) Assignee: SAP SE, Walldorf (DE)

( * ) Notice: Subject to any disclaimer, the term of this patent is extended or adjusted under 35 U.S.C. 154(b) by 162 days.

(21) Appl. No.: 17/528,592

(22) Filed: Nov. 17, 2021

(65) Prior Publication Data

US 2023/0153091 A1   May 18, 2023

(51) Int. Cl.
*G06F 8/61* (2018.01)
*G06F 8/71* (2018.01)

(52) U.S. Cl.
CPC . *G06F 8/61* (2013.01); *G06F 8/71* (2013.01)

(58) Field of Classification Search
CPC ..................................... G06F 8/61; G06F 8/71
See application file for complete search history.

(56) References Cited

U.S. PATENT DOCUMENTS

| | | | | |
|---|---|---|---|---|
| 7,293,268 B2* | 11/2007 | Masuda | ..................... | G06F 8/60 |
| | | | | 717/174 |
| 8,769,522 B2* | 7/2014 | Venkatraman | ........ | H04L 63/104 |
| | | | | 717/169 |
| 10,318,272 B1* | 6/2019 | Manuilov | ............... | H04L 67/06 |
| 10,841,403 B2* | 11/2020 | Tyebkhan | ................. | G06F 8/71 |
| 11,397,594 B1* | 7/2022 | David | .................... | G06F 16/986 |
| 2009/0171917 A1* | 7/2009 | Chou | ....................... | G06F 16/10 |
| 2010/0205284 A1* | 8/2010 | Newton | .................. | H04L 67/34 |
| | | | | 709/222 |
| 2011/0126192 A1* | 5/2011 | Frost | ......................... | G06F 8/61 |
| | | | | 717/178 |
| 2013/0111328 A1* | 5/2013 | Khanna | ................. | G06F 16/972 |
| | | | | 715/234 |
| 2014/0007070 A1* | 1/2014 | Huang | ...................... | G06F 8/65 |
| | | | | 717/170 |
| 2020/0092374 A1* | 3/2020 | Mehta | ................. | G06F 11/0793 |
| 2021/0240812 A1* | 8/2021 | McKenzie | .......... | G06F 21/6218 |
| 2023/0096143 A1* | 3/2023 | Kirmse | ..................... | G06F 8/65 |
| | | | | 717/169 |

* cited by examiner

*Primary Examiner* — Douglas M Slachta
(74) *Attorney, Agent, or Firm* — SCHWEGMAN LUNDBERG & WOESSNER, P.A.

(57) ABSTRACT

Techniques for implementing a systematic installation of software extensions are disclosed. In some embodiments, a computer system performs operations comprising: detecting a request to open a target file of a base computer program on a client machine, the target file residing on a server machine; determining that the target file includes a target version of a software extension; determining that a user of the client machine is part of a user group having administrative permission for the base computer program; determining that a systematic installation criterion from a group of systematic installation criteria is satisfied; and installing the target version of the software extension on the client machine based on the determining that the target file includes the target version, the determining that the user is part of the user group, and the determining that the systematic installation criterion is satisfied.

20 Claims, 7 Drawing Sheets

SYSTEMATIC INSTALLATION OF SOFTWARE EXTENSIONS

BACKGROUND

A software extension is a type of computer program that is meant to extend or add on to the functionality of a base program. Usually, the software extension has more instructions that the base program does not have. Either the base program or the extension can trigger the running of those instructions.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Figure 1:
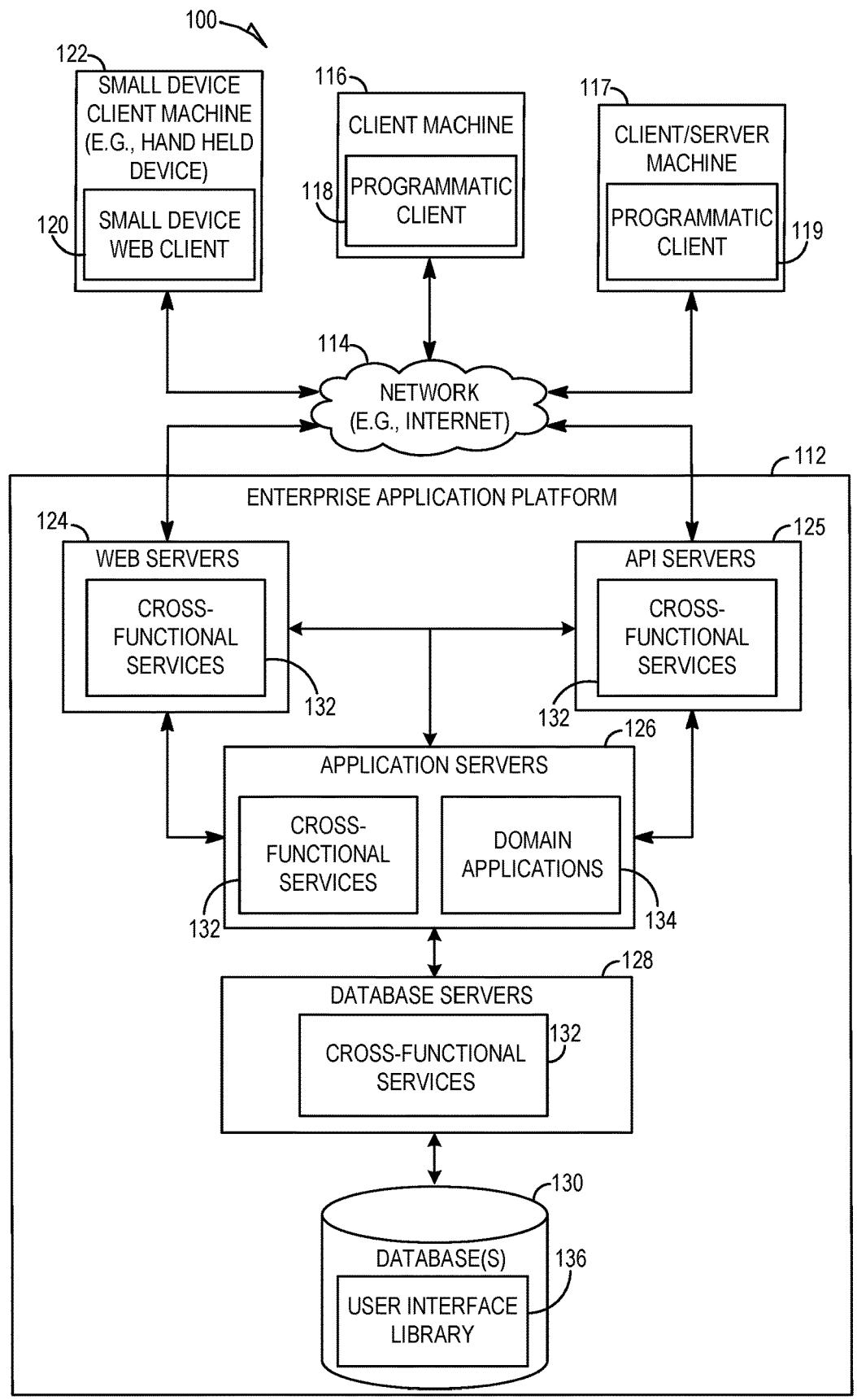
FIG. 1 is an example network diagram illustrating a system.

Example methods and systems for implementing a systematic installation of software extensions are disclosed. In the following description, for purposes of explanation, numerous specific details are set forth in order to provide a thorough understanding of example embodiments. It will be evident, however, to one skilled in the art that the present embodiments can be practiced without these specific details.

Currently, in order for a software extension to be installed on a machine, a user needs to manually provide an instruction to install the software extension on the machine. Since a user might not provide an instruction to install a software extension on a machine, the machine may fail to present the file completely on the machine or otherwise fail to include the feature of the software extension when loading the file on the machine. In addition to the issues discussed above, other technical problems may arise as well.

The implementation of the features disclosed herein involves a non-generic, unconventional, and non-routine operation or combination of operations. By applying one or more of the solutions disclosed herein, some technical effects of the system and method of the present disclosure are to provide a computer system that is specially-configured to implement a systematic installation of software extensions. The computer system may install a target version of a software extension of a base computer program on a machine, such as a client machine or a server machine, without receiving a user instruction to install the target version of the software extension on the machine based on a determination that a user of the machine is part of a user group having administrative permission for the base computer program and a determination that a systematic installation criterion from a group of systematic installation criteria. The group of systematic installation criteria may consist of: (a) no version of the software extension residing on the machine, and (b) if a version of the software extension resides on the machine, the current version of the software extension that resides on the machine is an earlier version of the software extension than the target version of the software extension. As a result of the systematic installation features disclosed herein, the complete functionality of a file is implemented on a machine, including all of the features intended by the user to be included in the file.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
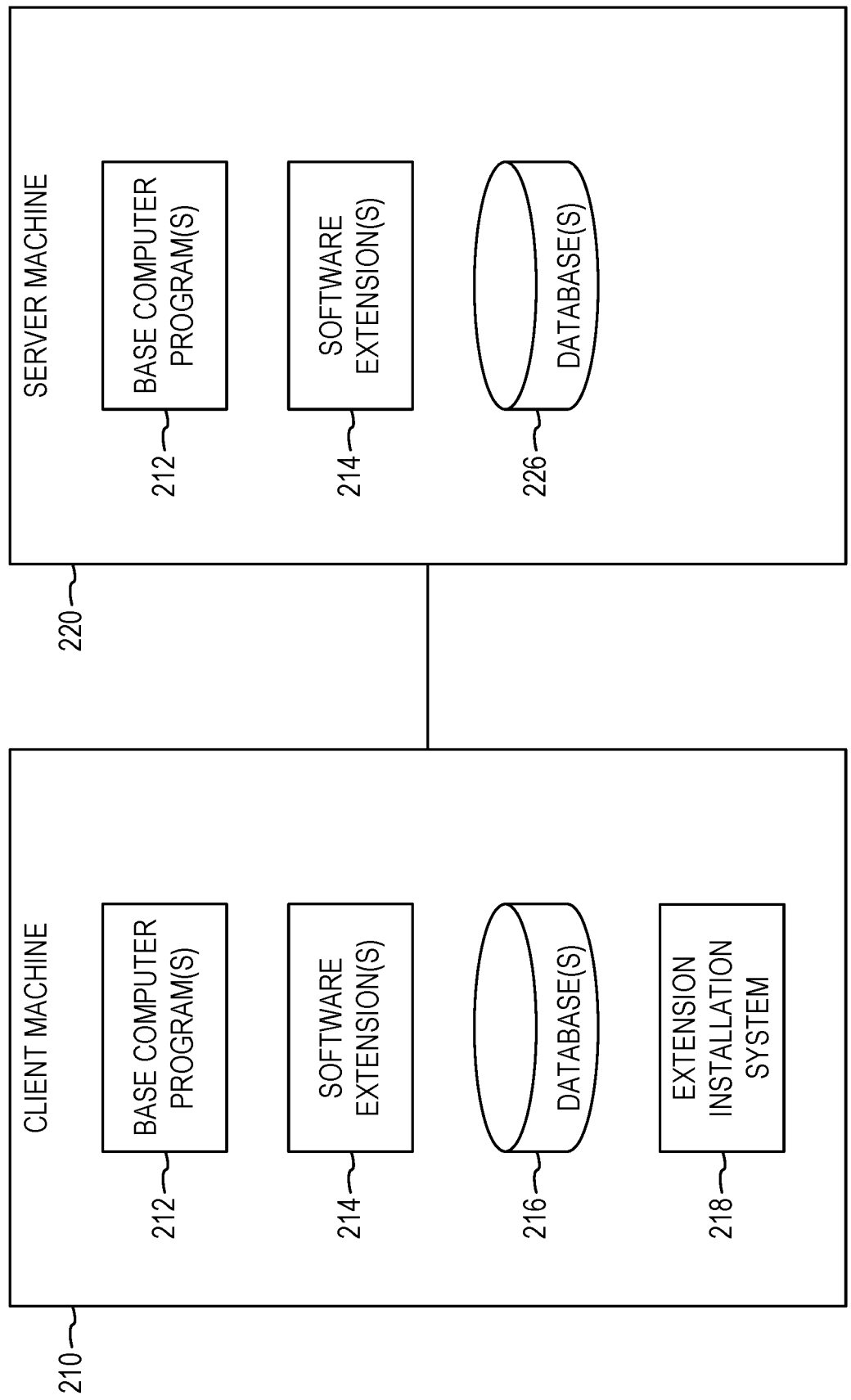
FIG. 2 is a block diagram illustrating an example extension installation system.

FIG. 2 is a block diagram illustrating an example extension installation system 218. The extension installation system 218 may be implemented on a client machine 210. In some example embodiments, the client machine 210 comprises a computer system, or other machine, having a memory and at least one processor (not shown). For example, the client machine 210 may comprise any of the machines 116, 117, or 122 of FIG. 1. However, other implementations of the client machine 210 are also within the scope of the present disclosure.

In some example embodiments, the client machine 210 also comprises one or more base computer programs 212. For example, the client machine 210 may comprise a base computer program 212 that is configured to enable users to gain insights from trusted enterprise data sources and personal data and to view or share those insights through interactive visualizations and tailored analysis applications. The base computer program 212 may provide user interface elements for visualization of data, such as charts, crosstabs, geo-maps, and filter components, along with analysis applications, templates, and samples. The base computer program 212 may also provide connectivity to enterprise data models, as well as to third-party databases and file data, for data acquisition, cleansing, and manipulation. The base computer program 212 may also comprise application programming interfaces (APIs) and software development kits (SDKs) configured to enable users to create specific visualizations and data connectors. Other types of base computer programs 212 are also within the scope of the present disclosure.

In addition to or as an alternative to the base computer program(s) 212 being implemented on the client machine 210, the same base computer program(s) 212 may be implemented on a server machine 220. In this respect, the base computer program(s) 212 may be implemented as a client-side application or as a server-side application. In some example embodiments, the server machine 220 comprises a computer system, or other machine, having a memory and at least one processor (not shown). For example, the server machine 220 may comprise the application server 126 of FIG. 1. However, other implementations of the server machine 220 are also within the scope of the present disclosure.

In some example embodiments, the extension installation system 218 is configured to perform various communication functions to facilitate the functionality described herein, such as by communicating with devices or machines via the network 114 using a wired or wireless connection. For example, the client machine 210 and the server machine 220 may communicate with one another via the network 114.

In some example embodiments, a user may use the base computer program 212 to create or modify a target file. The target file may comprise a document. However, other types of target files are also within the scope of the present disclosure. The target file may comprise text, images, audio, video, and other types of data. One or more software extensions 214 of the base computer program 212 may be used to add functionality to the base computer program 212 for use in creating or modifying the target file. In some example embodiments, the software extension 214 comprises a data access extension configured to acquire data from one or more data sources. For example, the user may want the base computer program 212 to have access to data from a data source to which the base computer program 212 currently lack access. In order to connect the base computer program 212 to the data source, the data access extension may be installed on the same machine as the base computer program 212. In other example embodiments, the software extension 214 comprises a visualization extension configured to enable use of one or more types of data visualizations via the base computer program 212. For example, the user may want to use a visualization feature not currently available in the base computer program 212. In order to enable use of the visualization feature via the base computer program 212, the visualization extension may be installed on the same machine as the base computer program 212. Other types of software extensions 214 are also within the scope of the present disclosure.

In some example embodiments, the client machine 210 comprises one or more databases 216, and the server machine 220 comprises one or more databases 226. A target file created or modified using the base computer program 212 may be stored in the database(s) 216 of the client machine 210 or in the database(s) 226 of the server machine 220. In a server-side implementation of the base computer program 212, a user of the client machine 210 may provide user input instructing the client machine 210 to connect to the server machine 220 and open the target file stored in the database(s) 226 of the server machine 220 in order to view, or otherwise consume, the target file. For example, the user may select a user interface element of the base computer program 212 to issue the instruction to open the target file. In response to the user instruction to open the target file that is stored in the database(s) 226 of the server machine 220, the extension installation system 218 may initiate a method of installing a software extension 214 from the server machine 220 onto the client machine 210 in order to enable the client machine 210 to open the target file on the client machine 210 using any software extensions included in the target file.

Figure 3:
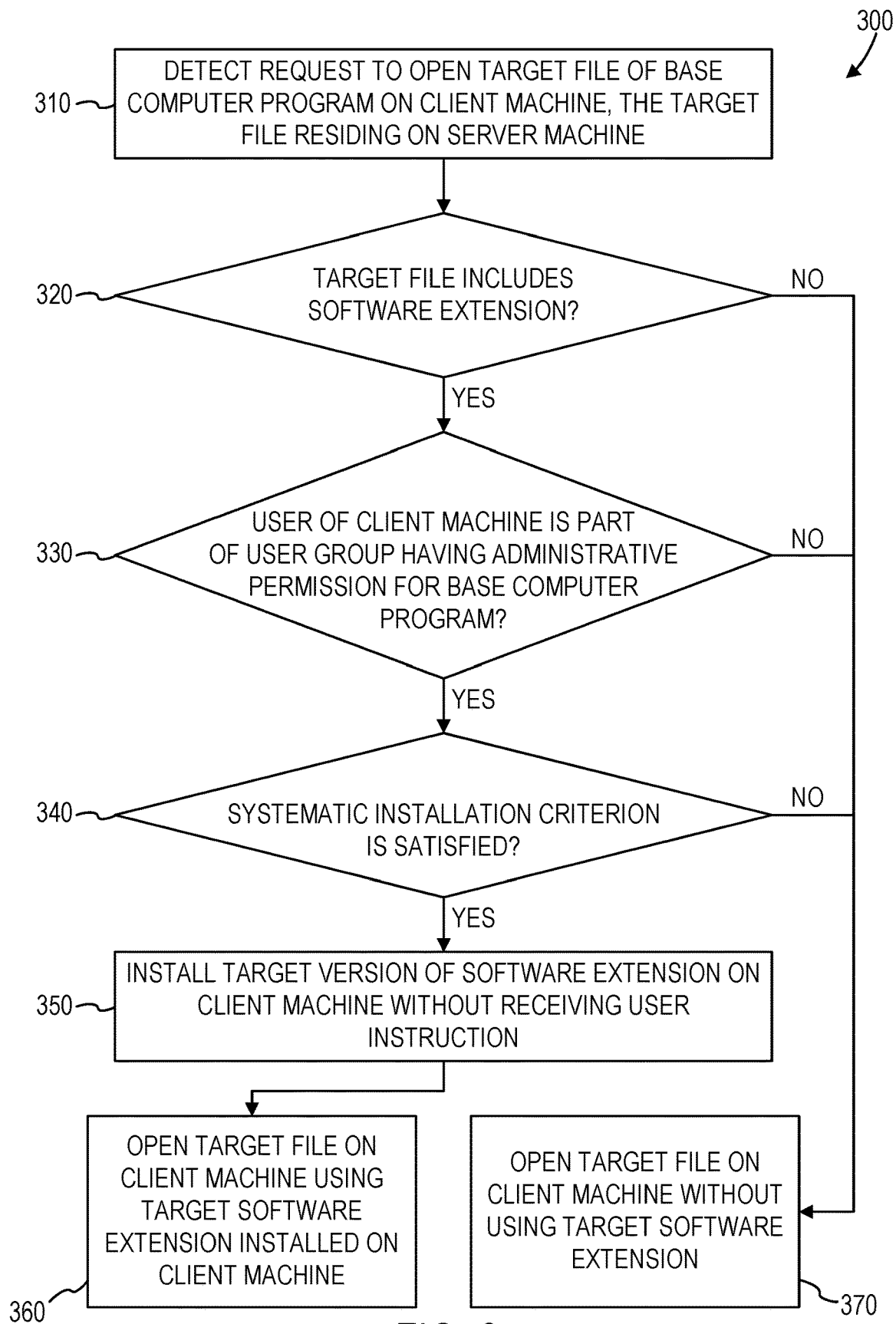
FIG. 3 is a flowchart illustrating an example method of installing a software extension from a server machine onto a client machine.

FIG. 3 is a flowchart illustrating an example method 300 of installing a software extension from a server machine onto a client machine. The method 300 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 300 are performed by the extension installation system 218 of FIG. 2.

At operation 310, the extension installation system 218 detects a request to open a target file of a base computer program 212 on a client machine 210. The target file may reside on a server machine 220. In some example embodiments, the target file comprises a document. However, other types of target files are also within the scope of the present disclosure.

The extension installation system 218 may determine, whether the target file includes a software extension 214 of the base computer program 212, at operation 320. The extension installation system 218 may obtain transmit a request to the server machine 220 to download the target file from the server machine 220. The request may include a request for details regarding any software extension 214 included in the target file. The server machine 220 may respond to the download request by transmitting the target file to the client machine 210 along with a list of any software extensions 214 included in the target file. The extension installation system 218 may check the response from the server machine 220 to determine whether the target file includes a software extension 214.

In some example embodiments, the software extension 214 comprises a data access extension configured to acquire data from one or more data sources. In other example embodiments, the software extension 214 comprises a visualization extension configured to enable use of one or more types of data visualizations via the base computer program 212. Other types of software extensions 214 are also within the scope of the present disclosure.

If, at operation 320, the extension installation system 218 determines that the target file does not include a software extension 214 of the base computer program 212, then the extension installation system 218 may proceed to operation 370, where the extension installation system 218 may open the target file on the client machine 210 without installing a software extension 214 on the client machine 210. If, at operation 320, the extension installation system 218 determines that the target file does include a software extension 214 of the base computer program 212, then the extension installation system 218 may determine the target version of the software extension 214 included in the target file and proceed to operation 330.

At operation 330, the extension installation system 218 may determine whether a user of the client machine 210 is part of a user group having administrative permission for the base computer program 212. In some example embodiments, the extension installation system 218 may determine whether the user of the client machine 210 is part of the user group having administrative permission for the base computer program 212 by accessing a list of members of the user group stored on the server machine 220, and then determining whether the user of the client machine 210 is part of the user group based on a comparison of an identification of the user with the list of members of the user group.

If, at operation 330, the extension installation system 218 determines that the user of the client machine 210 is not part of the user group having administrative permission for the base computer program 212, then the extension installation system 218 may proceed to operation 370, where the extension installation system 218 may open the target file on the client machine 210 without installing or using the target version of the software extension 214. If, at operation 330, the extension installation system 218 determines that the user of the client machine 210 is part of the user group having administrative permission for the base computer program 212, then the extension installation system 218 may proceed to operation 340.

The extension installation system 218 may, at operation 340, determine whether a systematic installation criterion from a group of systematic installation criteria is satisfied. In some example embodiments, the group of systematic installation criteria consists of: no version of the software extension 214 resides on the client machine 210, and a current version of the software extension 214 that resides on the client machine 210 is an earlier version of the software extension 214 than the target version of the software extension 214.

If, at operation 340, the extension installation system 218 determines that no systematic installation criterion from the group of systematic installation criteria is satisfied, then the extension installation system 218 may proceed to operation 370, where the extension installation system 218 may open the target file on the client machine 210 without installing or using the target version of the software extension 214. If, at operation 340, the extension installation system 218 determines that one of the systematic installation criterion from the group of systematic installation criteria is satisfied, then the extension installation system 218 may proceed to operation 350.

At operation 350, the extension installation system 218 may install the target version of the software extension 214 on the client machine 210 without receiving a user instruction to install the target version of the software extension 214 on the client machine 210 based on the determination at operation 320 that the target file includes the target version of the software extension 214, the determination at operation 330 that the user is part of the user group having administrative permission, and the determination at operation 340 that the systematic installation criterion is satisfied. In some example embodiments, the extension installation system 218 may install the target version of the software extension 214 on the client machine 210 by downloading the target version of the software extension 214 from the server machine 220 (e.g., by transmitting a download request to the server machine 220) and storing the target version of the software extension 214 on the client machine 210.

Then, the extension installation system 218 may open the target file on the client machine 210 using the target software extension 214 installed on the client machine 210, at operation 360. For example, if the target file comprises a document, then the document may be displayed on the client machine 210 along with one or more features of the target version of the software extension 214.

It is contemplated that any of the other features described within the present disclosure can be incorporated into the method 300.

Figure 4:
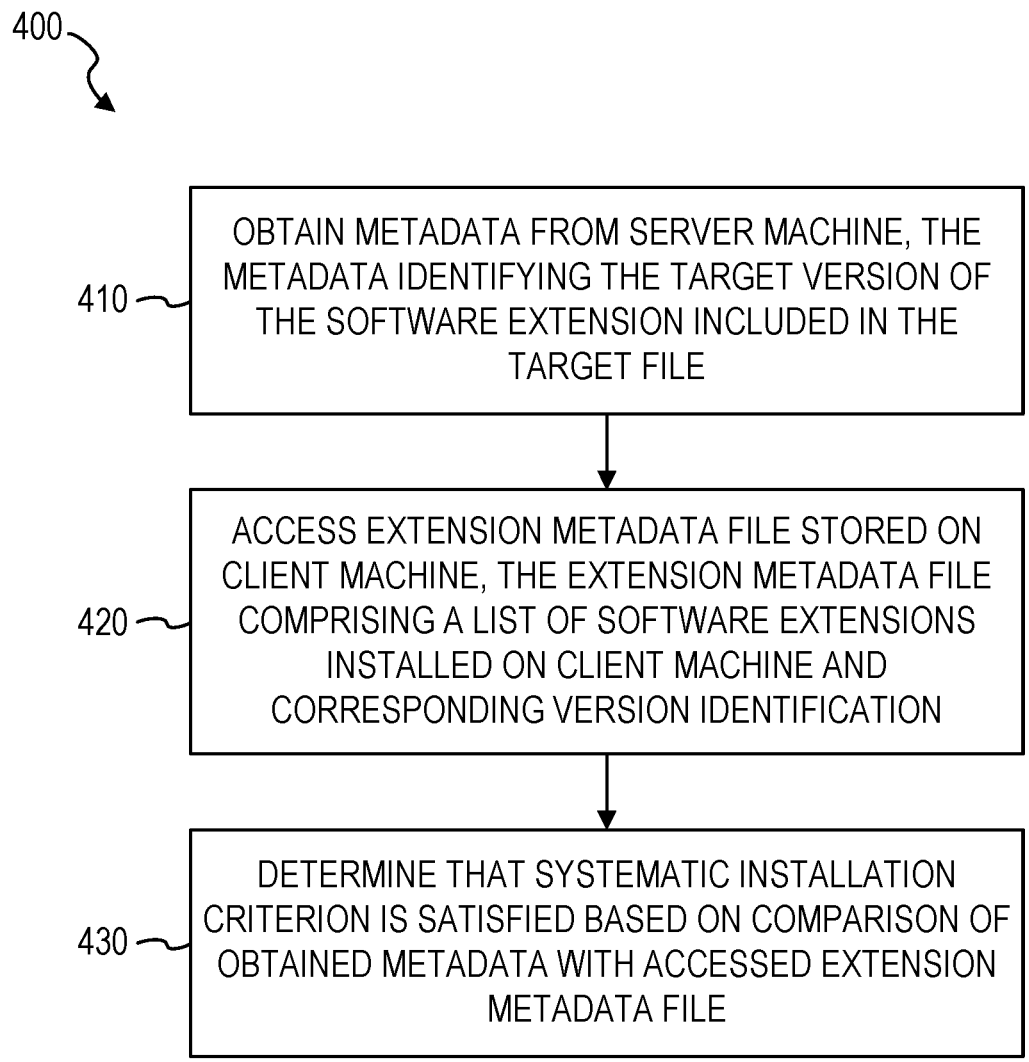
FIG. 4 is a flowchart illustrating an example method of determining that a systematic installation criterion is satisfied.

FIG. 4 is a flowchart illustrating an example method 400 of determining that a systematic installation criterion is satisfied. The method 400 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 400 are performed by the extension installation system 218 of FIG. 2. The method 400 may comprise operations 410, 420, and 430, which may be incorporated into operation 340 of the method 300 in FIG. 3.

At operation 410, the extension installation system 218 may obtain metadata from the server machine 220. In some example embodiments, the metadata identifies the target version of the software extension 214 included in the target file.

The extension installation system 218 may, at operation 420, access an extension metadata file stored on the client machine 210. The extension metadata file may comprise a list of software extensions 214 installed on the client machine 210 and a corresponding version identification for each software extension 214 in the list of software extensions 214. In some example embodiments, the extension metadata file comprises a JavaScript® Object Notation (JSON) file. However, other types of extension metadata files are also within the scope of the present disclosure.

Then, the extension installation system 218 may determine that the systematic installation criterion is satisfied based on a comparison of the obtained metadata with the accessed extension metadata file, at operation 430. As a result of this determination at operation 430, the target version of the software extension 214 may be installed on the client machine 210, such as at operation 350 of the method 300 in FIG. 3. In some example embodiments, the installing of the target version of the software extension 214 on the client machine 210 comprises updating the extension metadata file to include the installed target version of the software extension 214.

It is contemplated that any of the other features described within the present disclosure can be incorporated into the method 400.

In a client-side implementation of the base computer program 212, a user of the client machine 210 may provide user input instructing the client machine 210 to connect to the server machine 220 and upload the target file from the client machine 210 to the server machine 220, such as in order to make the target file accessible to other users of the server machine 220. For example, the user may select a user interface element of the base computer program 212 to issue the instruction to save the target file on the server machine 220. In response to the user instruction to save the target file on the server machine 220, the extension installation system 218 may initiate a method of installing a software extension 214 from the client machine 210 onto the server machine 220 in order to include the features of any software extensions included in the target file when the target file uploaded onto the server machine 220 is opened.

Figure 5:
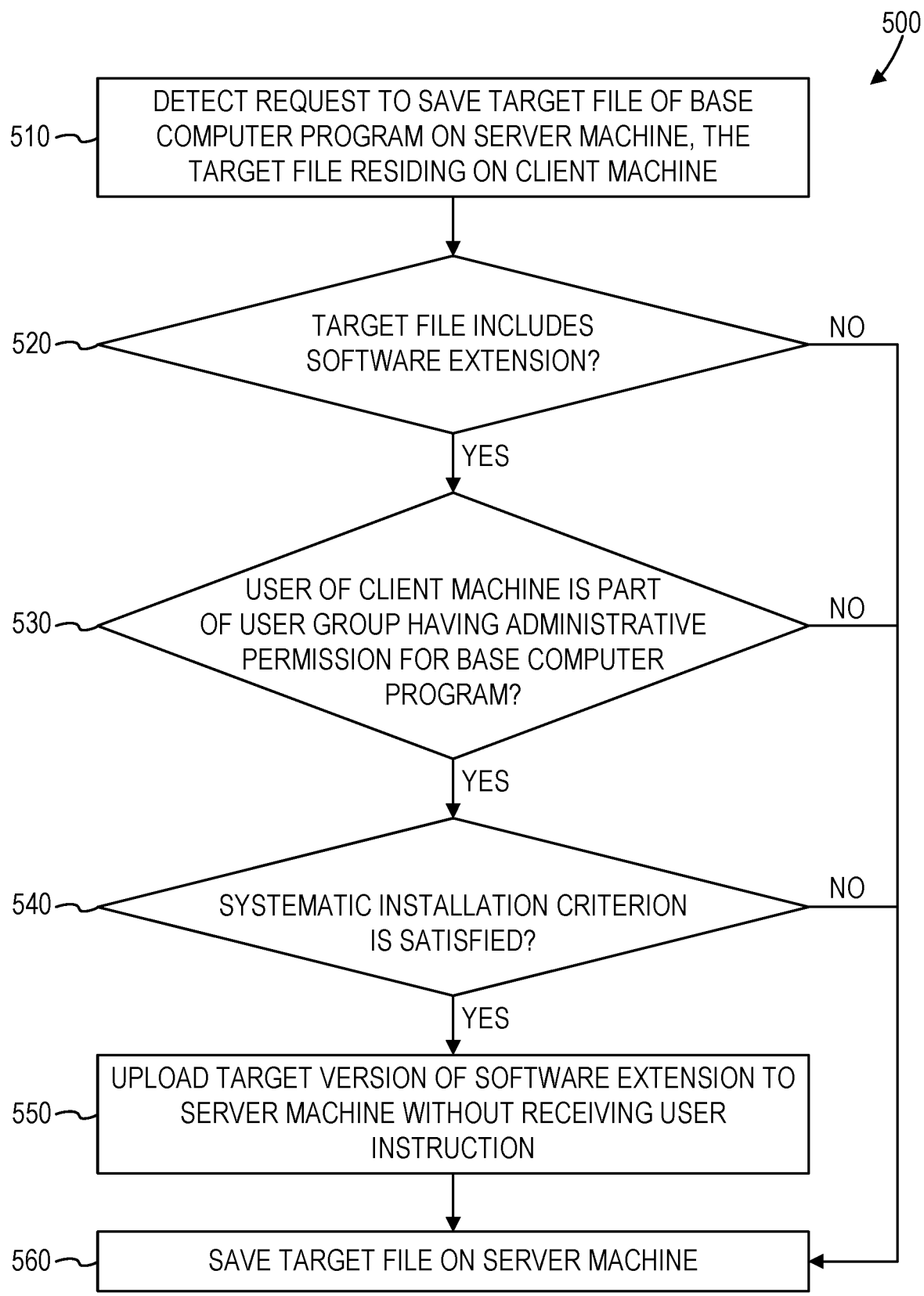
FIG. 5 is a flowchart illustrating an example method of installing a software extension from a client machine onto a server machine.

FIG. 5 is a flowchart illustrating an example method 500 of installing a software extension from a client machine onto a server machine. The method 500 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 500 are performed by the extension installation system 218 of FIG. 2.

At operation 510, the extension installation system 218 may detect a request to save a target file of a base computer program 212 on a server machine 220. The target file may reside on a client machine 210, such as stored in the database(s) 216. In some example embodiments, the target file comprises a document. However, other types of target files are also within the scope of the present disclosure.

The extension installation system 218 may determine, whether the target file includes a software extension 214 of the base computer program 212, at operation 520. In some example embodiments, the software extension 214 comprises a data access extension configured to acquire data from one or more data sources. In other example embodiments, the software extension 214 comprises a visualization extension configured to enable use of one or more types of data visualizations via the base computer program 212. Other types of software extensions are also within the scope of the present disclosure.

If, at operation 520, the extension installation system 218 determines that the target file does not include a software extension 214 of the base computer program 212, then the extension installation system 218 may proceed to operation 560, where the extension installation system 218 may save the target file on the server machine 220 without uploading a software extension 214 to the server machine 220. If, at operation 520, the extension installation system 218 determines that the target file does include a software extension 214 of the base computer program 212, then the extension installation system 218 may determine the target version of the software extension 214 included in the target file and proceed to operation 530.

At operation 530, the extension installation system 218 may determine whether a user of the client machine 210 is part of a user group having administrative permission for the base computer program 212. In some example embodiments, the extension installation system 218 may determining whether the user of the client machine 210 is part of the user group having administrative permission for the base computer program 212 comprises by accessing a list of members of the user group stored on the server machine 220, and then determining whether the user of the client machine 210 is part of the user group based on a comparison of an identification of the user with the list of members of the user group.

If, at operation 530, the extension installation system 218 determines that the user of the client machine 210 is not part of the user group having administrative permission for the base computer program 212, then the extension installation system 218 may proceed to operation 560, where the extension installation system 218 may save the target file on the server machine 220 without uploading a software extension 214 to the server machine 220. If, at operation 530, the extension installation system 218 determines that the user of the client machine 210 is part of the user group having administrative permission for the base computer program 212, then the extension installation system 218 may proceed to operation 504.

The extension installation system 218 may, at operation 540, determine whether a systematic installation criterion from a group of systematic installation criteria is satisfied. In some example embodiments, the group of systematic installation criteria consists of: no version of the software extension 214 resides on the client machine 210, and a current version of the software extension 214 that resides on the client machine 210 is an earlier version of the software extension 214 than the target version of the software extension 214.

If, at operation 540, the extension installation system 218 determines that no systematic installation criterion from the group of systematic installation criteria is satisfied, then the extension installation system 218 may proceed to operation 560, where the extension installation system 218 may save the target file on the server machine 220 without uploading a software extension 214 to the server machine 220. If, at operation 540, the extension installation system 218 determines that one of the systematic installation criterion from the group of systematic installation criteria is satisfied, then the extension installation system 218 may proceed to operation 550.

At operation 550, the extension installation system 218 may upload the target version of the software extension 214 to the server machine 220 without receiving a user instruction to upload the target version of the software extension 214 to the server machine 220 based on the determination at operation 520 that the target file includes the target version of the software extension 214, the determination at operation 530 that the user is part of the user group having administrative permission, and the determination at operation 530 that the systematic installation criterion is satisfied.

The extension installation system 218 may, at operation 560, save the target file on the sever machine 220. For example, the extension installation system 218 may upload the target file to the server machine 220 along with a request to save the target file on the server machine 220.

It is contemplated that any of the other features described within the present disclosure can be incorporated into the method 500.

Figure 6:
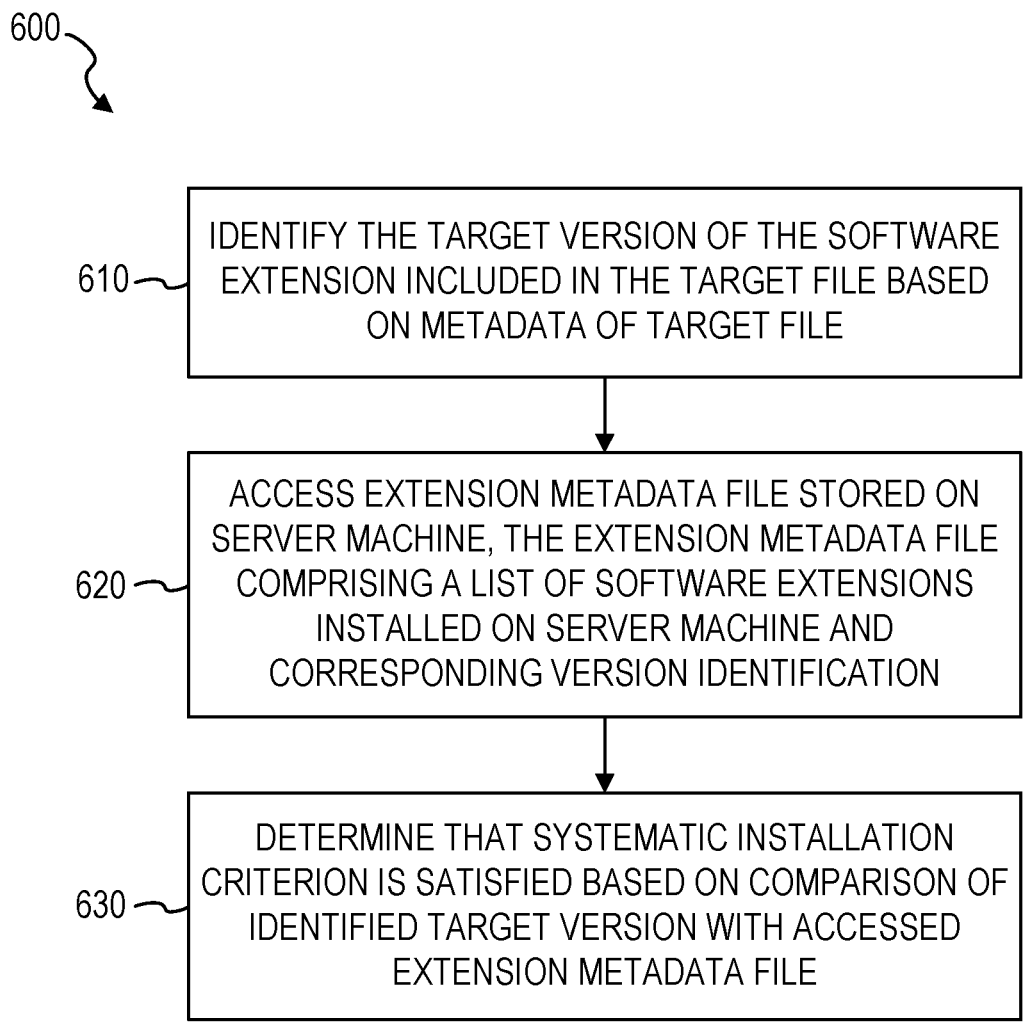
FIG. 6 is a flowchart illustrating another example method of determining that a systematic installation criterion is satisfied.

FIG. 6 is a flowchart illustrating another example method 600 of determining that a systematic installation criterion is satisfied. The method 600 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 600 are performed by the extension installation system 218 of FIG. 2. The method 600 may comprise operations 610, 620, and 630, which may be incorporated into operation 540 of the method 500 in FIG. 5.

At operation 610, the extension installation system 218 may identify the target version of the software extension 214 included in the target file based on metadata of the target file.

The extension installation system 218 may, at operation 620, access an extension metadata file stored on the server machine 220. In some example embodiments, the extension metadata file comprises a list of software extensions 214 installed on the server machine 220 and a corresponding version identification for each software extension 214 in the list of software extensions 214.

Then, the extension installation system 218 may determine that the systematic installation criterion is satisfied based on a comparison of the identified target version of the software extension 214 with the accessed extension metadata file, at operation 630. As a result of this determination at operation 630, the target version of the software extension 214 may be uploaded to the server machine 220, such as at operation 550 of the method 500 in FIG. 5. In some example embodiments, the uploading of the target version of the software extension 214 to the server machine 220 comprises updating the extension metadata file to include the uploaded target version of the software extension 214.

It is contemplated that any of the other features described within the present disclosure can be incorporated into the method 600.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: detecting a request to open a target file of a base computer program on a client machine, the target file residing on a server machine; determining that the target file includes a target version of a software extension of the base computer program; determining that a user of the client machine is part of a user group having administrative permission for the base computer program; determining that a systematic installation criterion from a group of systematic installation criteria is satisfied, the group of systematic installation criteria consisting of: no version of the software extension resides on the client machine, and a current version of the software extension that resides on the client machine is an earlier version of the software extension than the target version of the software extension; installing the target version of the software extension on the client machine without receiving a user instruction to install the target version of the software extension on the client machine based on the determining that the target file includes the target version of the software extension, the determining that the user is part of the user group having administrative permission, and the determining that the systematic installation criterion is satisfied; and opening the target file on the client machine using the target software extension installed on the client machine.

Example 2 includes the computer-implemented method of example 1, wherein the target file comprises a document.

Example 3 includes the computer-implemented method of example 1 or example 2, wherein the determining that the systematic installation criterion is satisfied comprises: obtaining metadata from the server machine, the metadata identifying the target version of the software extension included in the target file; accessing an extension metadata file stored on the client machine, the extension metadata file comprising a list of software extensions installed on the client machine and a corresponding version identification for each software extension in the list of software extensions; and determining that the systematic installation criterion is satisfied based on a comparison of the obtained metadata with the accessed extension metadata file.

Example 4 includes the computer-implemented method of any one of examples 1 to 3, wherein the installing the target version of the software extension on the client machine comprises updating the extension metadata file to include the installed target version of the software extension.

Example 5 includes the computer-implemented method of any one of examples 1 to 4, wherein the determining that the user of the client machine is part of the user group having administrative permission for the base computer program comprises: accessing a list of members of the user group stored on the server machine; and determining that the user of the client machine is part of the user group based on a comparison of an identification of the user with the list of members of the user group.

Example 6 includes the computer-implemented method of any one of examples 1 to 5, wherein the target version of the software extension comprises a data access extension configured to acquire data from one or more data sources.

Example 7 includes the computer-implemented method of any one of examples 1 to 6, wherein the target version of the software extension comprises a visualization extension configured to enable use of one or more types of data visualizations via the base computer program.

Example 8 includes a system comprising: at least one processor; and a non-transitory computer-readable medium storing executable instructions that, when executed, cause the at least one processor to perform the method of any one of examples 1 to 7.

Example 9 includes a non-transitory machine-readable storage medium, tangibly embodying a set of instructions that, when executed by at least one processor, causes the at least one processor to perform the method of any one of examples 1 to 7.

Example 10 includes a machine-readable medium carrying a set of instructions that, when executed by at least one processor, causes the at least one processor to carry out the method of any one of examples 1 to 7.

Example 11 includes a computer-implemented method performed by a computer system having a memory and at least one hardware processor, the computer-implemented method comprising: detecting a request to save a target file of a base computer program on a server machine, the target file residing on a client machine; determining that the target file includes a target version of a software extension of the base computer program; determining that a user of the client machine is part of a user group having administrative permission for the base computer program; determining that a systematic installation criterion from a group of systematic installation criteria is satisfied, the group of systematic installation criteria consisting of: no version of the software extension resides on the server machine, and a current version of the software extension that resides on the server machine is an earlier version of the software extension than the target version of the software extension; uploading the target version of the software extension to the server machine without receiving a user instruction to upload the target version of the software extension to the server machine based on the determining that the target file includes the target version of the software extension, the determining that the user is part of the user group having administrative permission, and the determining that the systematic installation criterion is satisfied; and saving the target file on the sever machine.

Example 12 includes the computer-implemented method of example 11, wherein the target file comprises a document.

Example 13 includes the computer-implemented method of example 11 or example 12, wherein the determining that the systematic installation criterion is satisfied comprises: identifying the target version of the software extension included in the target file based on metadata of the target file; accessing an extension metadata file stored on the server machine, the extension metadata file comprising a list of software extensions installed on the server machine and a corresponding version identification for each software extension in the list of software extensions; and determining that the systematic installation criterion is satisfied based on a comparison of the identified target version of the software extension with the accessed extension metadata file.

Example 14 includes the computer-implemented method of any one of examples 11 to 13, wherein the uploading the target version of the software extension to the server machine comprises updating the extension metadata file to include the installed target version of the software extension.

Example 15 includes the computer-implemented method of any one of examples 11 to 14, wherein the determining that the user of the client machine is part of the user group having administrative permission for the base computer program comprises: accessing a list of members of the user group stored on the server machine; and determining that the user of the client machine is part of the user group based on a comparison of an identification of the user with the list of members of the user group.

Example 16 includes the computer-implemented method of any one of examples 11 to 15, wherein the target version of the software extension comprises a data access extension configured to acquire data from one or more data sources.

Example 17 includes the computer-implemented method of any one of examples 11 to 16, wherein the target version of the software extension comprises a visualization extension configured to enable use of one or more types of data visualizations via the base computer program.

Example 18 includes a system comprising: at least one processor; and a non-transitory computer-readable medium storing executable instructions that, when executed, cause the at least one processor to perform the method of any one of examples 11 to 17.

Example 19 includes a non-transitory machine-readable storage medium, tangibly embodying a set of instructions that, when executed by at least one processor, causes the at least one processor to perform the method of any one of examples 11 to 17.

Example 20 includes a machine-readable medium carrying a set of instructions that, when executed by at least one processor, causes the at least one processor to carry out the method of any one of examples 11 to 17.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 7:
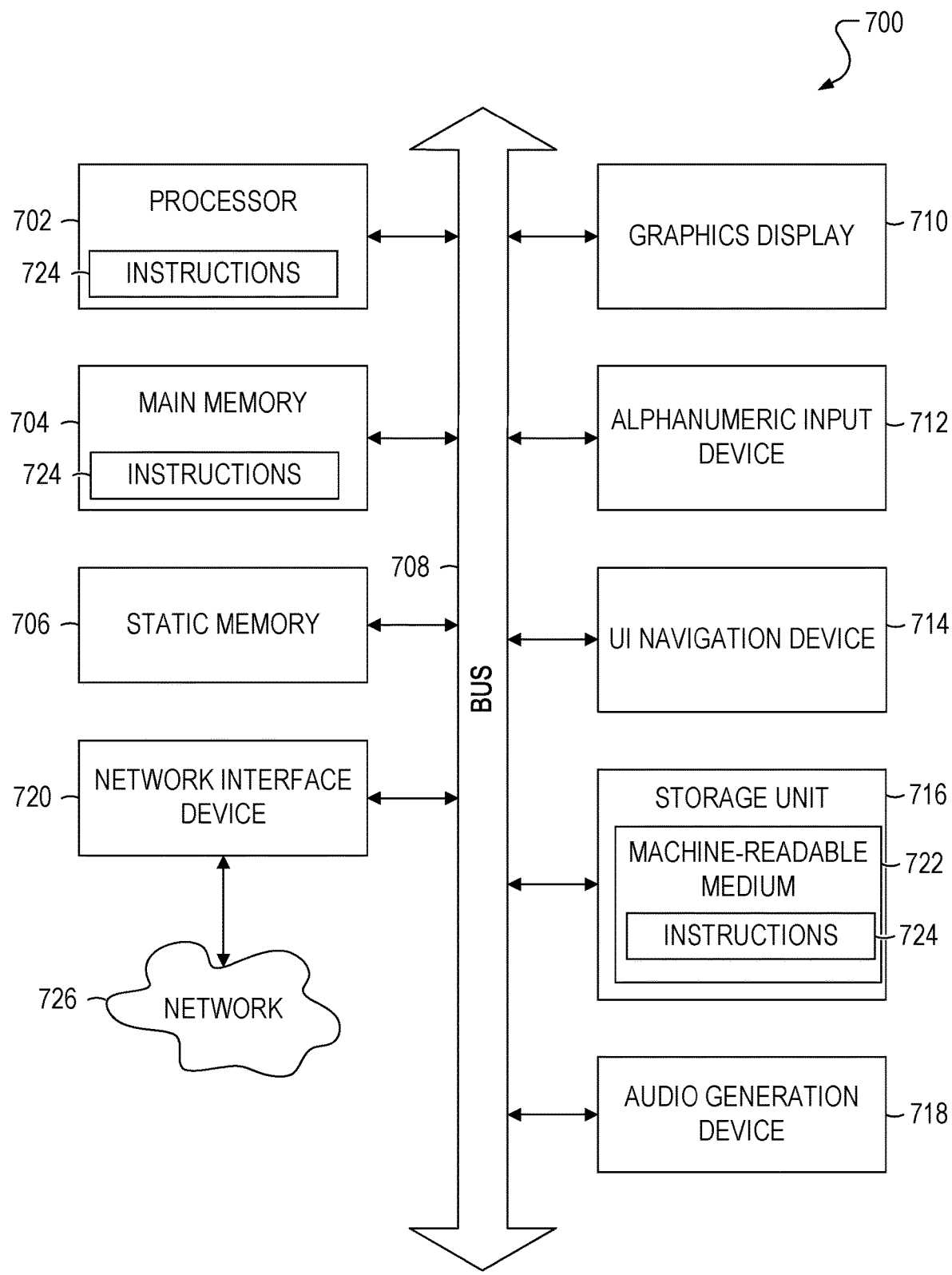
FIG. 7 is a block diagram of an example computer system on which methodologies described herein can be executed.

FIG. 7 is a block diagram of a machine in the example form of a computer system 700 within which instructions 724 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704, and a static memory 706, which communicate with each other via a bus 708. The computer system 700 may further include a graphics or video display unit 710 (e.g., a liquid crystal display (LCD) or a cathode ray tube (CRT)). The computer system 700 also includes an alphanumeric input device 712 (e.g., a keyboard), a user interface (UI) navigation (or cursor control) device 714 (e.g., a mouse), a storage unit (e.g., a disk drive unit) 716, an audio or signal generation device 718 (e.g., a speaker), and a network interface device 720.

The storage unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media. The instructions 724 may also reside, completely or at least partially, within the static memory 706.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system having a memory and at least one hardware processor, the computer-implemented method comprising:

detecting a request to open a target file of a base computer program on a client machine, the target file residing on a server machine;

determining that the target file includes a target version of a software extension of the base computer program;
determining that a user of the client machine is part of a user group having administrative permission for the base computer program;
determining that a systematic installation criterion from a group of systematic installation criteria is satisfied, the group of systematic installation criteria consisting of:
no version of the software extension resides on the client machine, and
a current version of the software extension that resides on the client machine is an earlier version of the software extension than the target version of the software extension;
installing the target version of the software extension on the client machine without receiving a user instruction to install the target version of the software extension on the client machine based on the determining that the target file includes the target version of the software extension, the determining that the user is part of the user group having administrative permission, and the determining that the systematic installation criterion is satisfied; and
opening the target file on the client machine using the target software extension installed on the client machine.

2. The computer-implemented method of claim 1, wherein the target file comprises a document.

3. The computer-implemented method of claim 1, wherein the determining that the systematic installation criterion is satisfied comprises:
obtaining metadata from the server machine, the metadata identifying the target version of the software extension included in the target file;
accessing an extension metadata file stored on the client machine, the extension metadata file comprising a list of software extensions installed on the client machine and a corresponding version identification for each software extension in the list of software extensions; and
determining that the systematic installation criterion is satisfied based on a comparison of the obtained metadata with the accessed extension metadata file.

4. The computer-implemented method of claim 3, wherein the installing the target version of the software extension on the client machine comprises updating the extension metadata file to include the installed target version of the software extension.

5. The computer-implemented method of claim 1, wherein the determining that the user of the client machine is part of the user group having administrative permission for the base computer program comprises:
accessing a list of members of the user group stored on the server machine; and
determining that the user of the client machine is part of the user group based on a comparison of an identification of the user with the list of members of the user group.

6. The computer-implemented method of claim 1, wherein the target version of the software extension comprises a data access extension configured to acquire data from one or more data sources.

7. The computer-implemented method of claim 1, wherein the target version of the software extension comprises a visualization extension configured to enable use of one or more types of data visualizations via the base computer program.

8. A system of comprising:
at least one hardware processor; and
a non-transitory computer-readable medium storing executable instructions that, when executed, cause the at least one processor to perform operations comprising:
detecting a request to open a target file of a base computer program on a client machine, the target file residing on a server machine;
determining that the target file includes a target version of a software extension of the base computer program;
determining that a user of the client machine is part of a user group having administrative permission for the base computer program;
determining that a systematic installation criterion from a group of systematic installation criteria is satisfied, the group of systematic installation criteria consisting of:
no version of the software extension resides on the client machine, and
a current version of the software extension that resides on the client machine is an earlier version of the software extension than the target version of the software extension;
installing the target version of the software extension on the client machine without receiving a user instruction to install the target version of the software extension on the client machine based on the determining that the target file includes the target version of the software extension, the determining that the user is part of the user group having administrative permission, and the determining that the systematic installation criterion is satisfied; and
opening the target file on the client machine using the target software extension installed on the client machine.

9. The system of claim 8, wherein the target file comprises a document.

10. The system of claim 8, wherein the determining that the systematic installation criterion is satisfied comprises:
obtaining metadata from the server machine, the metadata identifying the target version of the software extension included in the target file;
accessing an extension metadata file stored on the client machine, the extension metadata file comprising a list of software extensions installed on the client machine and a corresponding version identification for each software extension in the list of software extensions; and
determining that the systematic installation criterion is satisfied based on a comparison of the obtained metadata with the accessed extension metadata file.

11. The system of claim 10, wherein the installing the target version of the software extension on the client machine comprises updating the extension metadata file to include the installed target version of the software extension.

12. The system of claim 8, wherein the determining that the user of the client machine is part of the user group having administrative permission for the base computer program comprises:
accessing a list of members of the user group stored on the server machine; and
determining that the user of the client machine is part of the user group based on a comparison of an identification of the user with the list of members of the user group.

13. The system of claim 8, wherein the target version of the software extension comprises a data access extension configured to acquire data from one or more data sources.

14. The system of claim 8, wherein the target version of the software extension comprises a visualization extension configured to enable use of one or more types of data visualizations via the base computer program.

15. A non-transitory machine-readable storage medium tangibly embodying a set of instructions that, when executed by at least one hardware processor, causes the at least one processor to perform operations comprising:
   detecting a request to open a target file of a base computer program on a client machine, the target file residing on a server machine;
   determining that the target file includes a target version of a software extension of the base computer program;
   determining that a user of the client machine is part of a user group having administrative permission for the base computer program;
   determining that a systematic installation criterion from a group of systematic installation criteria is satisfied, the group of systematic installation criteria consisting of:
      no version of the software extension resides on the client machine, and
      a current version of the software extension that resides on the client machine is an earlier version of the software extension than the target version of the software extension;
   installing the target version of the software extension on the client machine without receiving a user instruction to install the target version of the software extension on the client machine based on the determining that the target file includes the target version of the software extension, the determining that the user is part of the user group having administrative permission, and the determining that the systematic installation criterion is satisfied; and
   opening the target file on the client machine using the target software extension installed on the client machine.

16. The non-transitory machine-readable storage medium of claim 15, wherein the target file comprises a document.

17. The non-transitory machine-readable storage medium of claim 15, wherein the determining that the systematic installation criterion is satisfied comprises:
   obtaining metadata from the server machine, the metadata identifying the target version of the software extension included in the target file;
   accessing an extension metadata file stored on the client machine, the extension metadata file comprising a list of software extensions installed on the client machine and a corresponding version identification for each software extension in the list of software extensions; and
   determining that the systematic installation criterion is satisfied based on a comparison of the obtained metadata with the accessed extension metadata file.

18. The non-transitory machine-readable storage medium of claim 17, wherein the installing the target version of the software extension on the client machine comprises updating the extension metadata file to include the installed target version of the software extension.

19. The non-transitory machine-readable storage medium of claim 15, wherein the determining that the user of the client machine is part of the user group having administrative permission for the base computer program comprises:
   accessing a list of members of the user group stored on the server machine; and
   determining that the user of the client machine is part of the user group based on a comparison of an identification of the user with the list of members of the user group.

20. The non-transitory machine-readable storage medium of claim 15, wherein the target version of the software extension comprises:
   a data access extension configured to acquire data from one or more data sources; or
   a visualization extension configured to enable use of one or more types of data visualizations via the base computer program.

\* \* \* \* \*